Patented Feb. 13, 1923.

1,445,352

UNITED STATES PATENT OFFICE.

CARL PFANSTIEHL, OF HIGHLAND PARK, ILLINOIS, ASSIGNOR TO SPECIAL CHEMICALS COMPANY, OF HIGHLAND PARK, ILLINOIS, A CORPORATION OF ILLINOIS.

TOOTH-CLEANING PREPARATION.

No Drawing. Application filed November 28, 1921. Serial No. 518,334.

*To all whom it may concern:*

Be it known that I, CARL PFANSTIEHL, a citizen of the United States, residing at Highland Park, in the county of Lake and State of Illinois, have invented a new and useful Improvement in Tooth-Cleaning Preparations, of which the following is a specification.

The present invention relates to tooth cleaning preparations and more particularly to those prepared and dispensed in the form of a paste.

In preparing such a tooth cleaning preparation in accordance with the present invention, a non-reactive, mildly abrasive filler in finely divided form is mixed with a vehicle comprising a lactone of a sugar acid in aqueous solution, in equilibrium with the sugar acid. The vehicle may contain also suitable body-forming constituents, such as gum tragacanth, gum arabic, glycerine, and the like, or mixtures thereof, and may, if desired, also contain a thinning agent, such as alcohol.

The proportion of lactone and acid present, expressed in the equivalent proportion of lactone (hereinafter designated as "proportion of lactone" for convenience), is at least 1% of the entire mass. For ordinary use the proportion of lactone may be from 1 to 4%, although in special preparations, wherein a particularly marked degree of tartar solvent or removing action is required, from 5 to 10% may be present. The lactones of sugar acids employed are preferably of hexonic acids, such as of galactonic acid, mannonic acid, gulonic acid and the like.

In the vehicle employed, water may be present, a suitable range of proportion being, for example, from 8 to 18% of the whole. The lactone, for example, galactonic lactone, is dissolved in at least its own weight of water, and preferably in the entire quantity used. The lactone solution may be incorporated at once into the preparation; it is, however, preferably boiled for about one-half hour, a partial conversion into acid being thereby effected and equilibrium between the lactone and acid being attained. The same equilibrium between lactone and acid in solution may be attained by dissolving an equivalent proportion of the acid in the water and boiling the solution. Where the lactone solution is incorporated into the paste without the preliminary boiling, the condition of equilibrium is slowly reached in the paste itself.

In preparing the paste, from 40 to 75% of a mildy abrasive filler which does not react with the sugar acid of the lactone is used. Suitable fillers are, for example, tricalcium phosphate, kieselguhr, and the like. Air-floated tricalcium phosphate has been found highly satisfactory for the purpose. With this is thoroughly incorporated the vehicle which may contain, in addition to the aqueous solution of lactone above described, a small proportion of a gumming material in solution, such as gum tragacanth, gum arabic or the like, glycerine, from 8 to 25% of the whole and, alcohol, from 5 to 15%, these having been previously added to the solution of lactone. A small proportion of flavoring material, such as oil of wintergree, oil of peppermint, or the like may likewise be employed. With higher proportions of fillers the proportion of alcohol in the vehicle may be increased and the proportion of glycerine decreased.

I claim:

1. In a tooth cleaning compound, a non-reactive, mildly abrasive filler and an aqueous vehicle, the vehicle containing a sugar acid lactone in solution.

2. In a tooth cleaning compound, a non-reactive, mildly abrasive filler, a body-supplying material and an aqueous vehicle comprising a sugar acid and its lactone in equilibrium in water solution.

3. In a tooth cleaning paste, tricalcium phosphate, and an aqueous solution of a sugar acid lactone.

4. In a tooth cleaning paste, tricalcium phosphate and an aqueous solution of galactonic lactone.

5. In a tooth cleaning paste, tricalcium phosphate and a vehicle comprising an aqueous solution of galactonic lactone and galactonic acid in equilibrium and a body supplying material.

6. A tooth cleaning paste comprising 40 to 75% of tricalcium phosphate, 1 to 4% of galactonic lactone dissolved in 8 to 18% of water, a small proportion of a stiffening gum, 8 to 25% of glycerine and 5 to 15% of alcohol.

CARL PFANSTIEHL.